Aug. 8, 1933.  J. GORETZKY  1,921,355

DEVICE FOR THE MANUFACTURING OF KNOTTED CARPETS AND THE LIKE

Filed Nov. 24, 1931   2 Sheets-Sheet 1

J. Goretzky
INVENTOR

By: Marks & Clerk
ATTYS.

Aug. 8, 1933.    J. GORETZKY    1,921,355
DEVICE FOR THE MANUFACTURING OF KNOTTED CARPETS AND THE LIKE
Filed Nov. 24, 1931    2 Sheets-Sheet 2
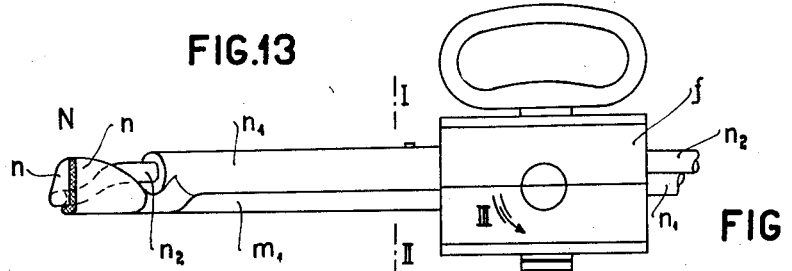
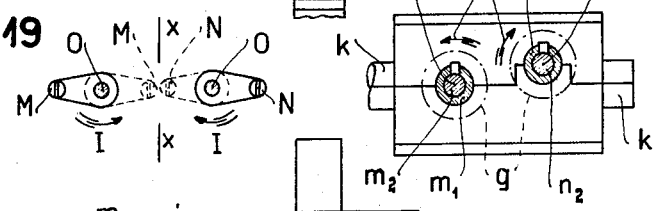
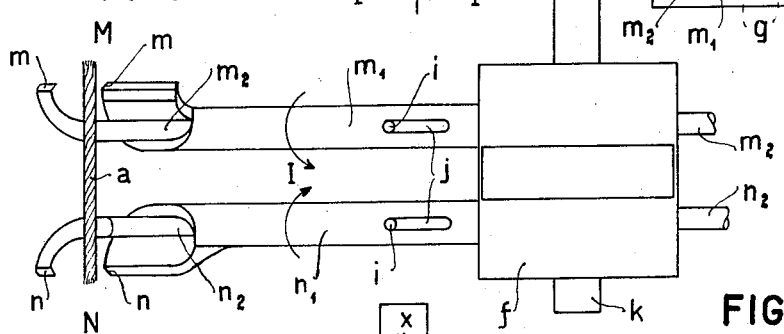
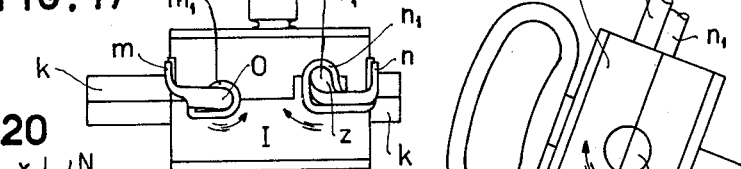
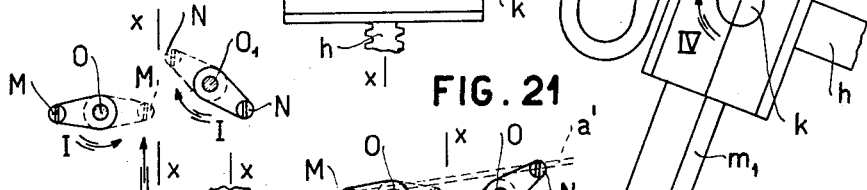
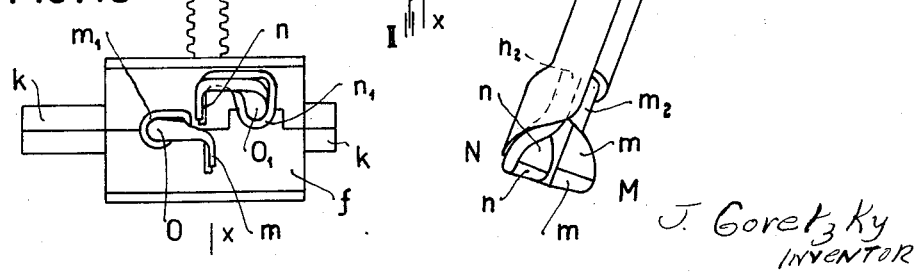

Patented Aug. 8, 1933

1,921,355

UNITED STATES PATENT OFFICE 1,921,355

DEVICE FOR THE MANUFACTURING OF KNOTTED CARPETS AND THE LIKE

Johann Goretzky, Reichenberg, Czechoslovakia

Application November 24, 1931, Serial No. 577,129, and in Germany December 1, 1930

6 Claims. (Cl. 139—4)

This invention relates to the mechanical manufacturing of knotted carpets, tapestries, coverings, and the like in which the pile is formed of short lengths of pile thread knotted in the manner of the known Smyrna or Persian knots into a system of ground warp threads, and more particularly to knotting devices of the type in which the forming of the loop and the tightening of the knot is effected by means of two knotting nippers which grip the length of pile thread to be knotted during the entire working cycle. Twin nipper knotting devices of this nature have always hitherto been so constructed that, in the knots formed by them, the free ends of the tufts which constitute the pile proper assume a position adjacent each other in the direction of the weft.

The present invention provides a twin nipper knotting device in which the jaws of the two nippers which hold the ends of the lengths of pile thread during the formation of the knots are displaced or shifted in relation to each other in a direction parallel to that of the warp, during the carrying out of the movement required for the drawing tight of the knot. In this manner it is possible to obtain, simply, without complicating the knotting mechanism proper, and without reducing the working speed, a more favourable shape and positioning of the knots, as regards both the appearance of the finished carpet and the greatest obtainable density of the knots, than has hitherto been possible with the known twin nipper knotting devices.

The carrying out of the invention is illustrated, by way of example in connection with the known Smyrna or Giordes knots, in the accompanying drawings, in which:—

Figs. 1, 2, and 3 show, in front elevation, in perspective, and in plan view, respectively, the Smyrna knots made by means of the hitherto known twin nipper knotting devices.

Figs. 4, 5, and 6 show, in the same views, the shape and positioning of the Smyrna knots as formed by the twin nipper knotting device constructed in accordance with the present invention.

Figs. 13–18 show a further modification of the knotting device embodying two rotatable and rockable knotting nippers.

Figs. 19–21 illustrate the action or movement of the operative parts with the form of the device shown in Figs. 13–18.

Figure 5:
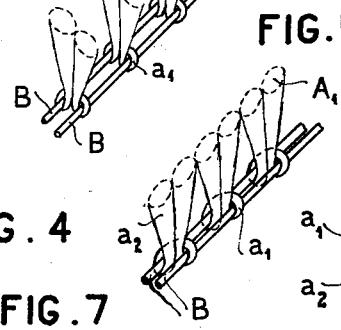
Figure 4:
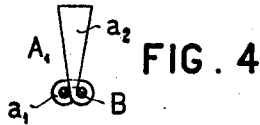
Figure 6:
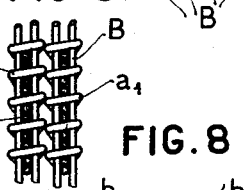

Referring to the drawings, the Smyrna knots A produced with the hitherto known twin nipper knotting devices are in the form of a double loop $a_1$ which is symmetrical in relation to its vertical axis $x$, and which encircles the two warp threads B. The free ends or tufts $a_2$ which form the pile assume a position between the two warp threads B adjacent each other in the direction of the weft. In the knots produced by the twin nipper knotting device constructed in accordance with the present invention the ends $a_2$ of the knots between the warp threads B lie adjacent each other not in the direction of the weft but, as shown in Figs. 4–6, in the direction of the warp. The knots $A_1$ are thus no longer perfectly symmetrical, and the knot loop $a_1$ crosses the warp threads B at an angle deviating slightly from 90°.

Figure 8:
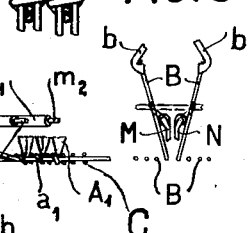
Figs. 7–11 show diagrammatically, and partly in perspective, the making of the knots shown in Figs. 4–6, and the appliances therefor for use in connection with mechanical knotters.
Figure 11:
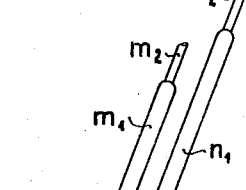

The actual formation of the loop is effected in the usual manner which is illustrated in the drawings by the example of the known Renard knotting nippers. A lifting-out and spreading device $b$ (Figs. 7 and 8) lifts out two warp threads B and spreads them apart in the direction of the weft. Between the spread warp threads B the two knotting nippers M, N (Figs. 7 and 9) are adapted to pass in in the opened condition and to receive the lengths of pile thread $a$ to be knotted in. The formation of the loop is effected by rotation of the nippers M, N in the direction of the arrows I (Fig. 9), and the tightening up of the knots by a movement of the nippers M, N towards the edge of the finished fabric (arrow II, Figs. 7, 10, and 11). As soon as one row of knots is completed a weft thread C (Fig. 7) is picked and beaten up by the blow of the reed $c$ of the slay $d$.

Figure 1:
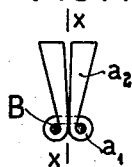
Figure 2:
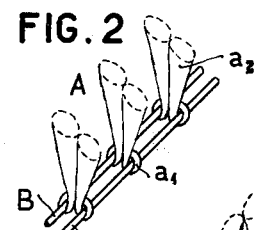
Figure 3:
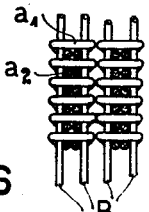
Figure 7:
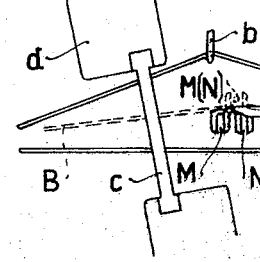
Figure 9:
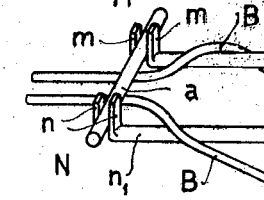
Figure 10:
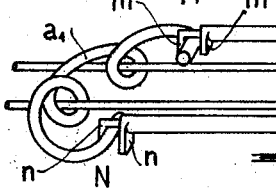
Figure 12:
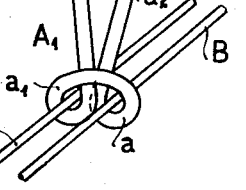
Fig. 12 shows, likewise in diagrammatic perspective view, a modified form of the new knotting device.

During the insertion of the length of pile thread $a$ in the opened knotting nippers M, N, and during the formation of the loop, the jaws $m$, $n$ of the nippers lie in a straight line parallel to the direction of the weft, as indicated in dotted lines in Fig. 7 and in full lines in Figs. 9 and 10. With the hitherto known twin nipper knotting devices for the manufacturing of knotted carpets the knotting nippers M, N proceed to carry out, with their jaws in the described relative positions, the movement in the direction of the arrow II which completes the knot A of the symmetrical shape shown in Figs. 1–3. In accordance with the present invention, however, the nippers M, N are displaced in relation to each other in a direction parallel to the warp threads during the tightening of the knot, the arrangement being that one of the two nippers is shifted or displaced in relation to the other to an extent which is somewhat exaggeratedly indicated at $y$ in the drawings. Thus, before the nippers M, N release the ends of the knots $A_1$, an additional movement in the direction of the warp is imparted to one of these nippers (see arrow II), and in this manner the shape of knot shown in Figs. 4–6, in which the ends $a_2$ lie in line with the warp, is produced.

The displacement or additional movement of one of the two nippers M, N can also be effected during the formation of the knot loop (Fig. 10) or just before the releasing of the finished knot. The mechanical means adopted for the effecting of the displacement of the knotting nippers M, N, or of the supplementary movement of one of these nippers in relation to the other, can be constructed in a variety of ways all of which can be put into practice without any difficulty by one skilled in the art concerned. For example, one of the two tubular knotting nippers (Figs. 7–11) can be so mounted in the common carrier as to be longitudinally slidable, and the required additional movement can be imparted by means of a stop or of an arrangement of levers. One of the two nippers can also equally well be provided with external screw threading and be so mounted in an internally threaded carrying member that, on carrying out the rotary movement in the direction of the arrow I (Fig. 9) it simultaneously carries out an additional movement in the direction of the warp (arrow II).

The shape of knot shown in Figs. 4–6 can also be obtained in an equally simple manner, and that without imparting an additional movement to one of the two knotting nippers, with twin nipper knotting devices of the type in which the knotting nippers carry out a rocking or swiveling movement during the tightening of the knot loop. Fig. 13 shows a knotter of this type constructed in accordance with the invention, in side elevation, with closed nippers, and before the formation of the loop; Fig. 14 shows a plan view with the nippers open; Fig. 15 shows, in side elevation, the position of the closed and rocked knotting nippers after the formation of the loop; Fig. 16 shows a section taken on the line I–II of Fig. 13. Figs. 17 and 18 show the knotting device with opened and closed nippers, in front elevation.

The clamping jaws $m$, $n$ of the knotting nippers M, N are provided in the usual manner on the ends of tubes $m_1$, $n_1$ and of rods $m_2$, $n_2$ slidably mounted therein. The tubes $m_1$, $n_1$ are mounted in a common carrier $f$ rotatable about their middle axes, and, within the hollow carrier $f$, are provided with toothed wheels $g$ (shown in dotted lines, Fig. 16) which can be revolved in the direction of the arrow I (Figs. 9, 16, and 17) by means of a doubly toothed rack $h$ meshing therewith, for the purpose of forming the length $a$ of pile thread into a double loop. The rods $m_2$, $n_2$ are each provided with a small pin $i$ which engages in a slot $j$ (Fig. 14) in the tubes $m_1$, $n_1$, so that the rods $m_2$, $n_2$ participate in the rotary movement of the tubes $m_1$, $n_1$ about their axes (arrow I), and yet are slidable in these tubes. The carrier $f$ is provided with two pins $k$ about which the knotting device can be rocked or swiveled (arrows III and IV, Figs. 13 and 15). In addition, a movement in the direction of the warp (arrow II) is imparted to the entire knotting mechanism, which movement effects the tightening up of the knot.

At the commencement of the working cycle the knotting apparatus assumes an approximately horizontal position (Fig. 13), and takes up the piece of pile thread $a$ to be knotted in the opened knotting nippers M, N (Fig. 14); after the closing of the jaws $m$, $n$ the knotting nippers are rotated in the direction of the arrow I, thus forming the knot loop, whereupon the knotting apparatus is rocked into the oblique position (Fig. 15) and shifted in the direction of the warp (arrow II), thus effecting the tightening up of the knot.

In the known knotting devices of this type, the axes of the knotting nippers M, N, and of the tubes $m_1$, $n_1$ are on the same level in the carrier $f$, that is to say the nippers are arranged symmetrically in the carrier. The jaws $m$, $n$ of the knotting nippers thus lie both before and after the rotation of the nippers symmetrically to each other, they being before rotation in the direction of the arrow I at a distance from each other corresponding to the length of the piece of pile thread $a$, and after this rotation closely adjacent each other.

In accordance with the invention, as is shown in Figs. 13–18, the axes of rotation of the two knotting nippers M, N are displaced relatively to each other in the common carrier $f$, in the example shown in Figs. 16–18 the right hand tube $n_1$ being mounted a few millimetres higher than the tube $m_1$. At the front end, however, the tubes $n_1$, as also the rods $n_2$ disposed therein, are not only laterally curved, as in the case of the other (left-hand) knotting nipper M, but are also bent downwards at the point denoted by $z$ in Fig. 17, so that before the formation of the loop the clamping jaws $n$ of the right-hand knotting nipper N lie, in spite of the above-mentioned displacement of the axes of rotation, on a level with the jaws $m$ of the left-hand knotting nipper M, and the tuft or piece of pile thread $a$ can be placed in the opened knotting nippers M, N in the usual manner. After the formation of the loop, that is to say after the rotation of the nippers in the direction of the arrow I, the closed jaws $n$ of the right-hand knotting nipper N, in consequence of the displacement of the axes of rotation of the two nippers in relation to each other, are no longer on a level with the jaws $m$ of the left-hand knotting nipper M, but, as shown in Fig. 18, somewhat higher than the left-hand nipper. If the knotting device be now rocked about the pivots $k$ in the direction of the arrow III into the inclined position shown in Fig. 15, in which the tubes $m_1$, $n_1$ are inclined at an angle of approximately 70°–80° to the plane of the warp threads B, then the knotting nipper N assumes a position behind the knotting nipper M in the direction of the warp. In these mutually displaced positions the two knotting nippers M, N carry out the movement in the direction of the warp which effects the tightening of the loose knot loop. Since the tightening of the knot loop is thus effected with the nippers displaced to each other in the direction of the warp, the result produced, as in the case of the form of construction shown in Figs. 7–12, is an asymmetrical knot of the type shown in Figs. 4–6. Only in the present instance, in consequence of the displacement of the axes of rotation of the two knotting nippers M, N in the carrier $f$, a special additional displacing movement of one of these two nippers is rendered unnecessary, since the same result is achieved by the rocking of the entire knotting apparatus from the horizontal to the inclined position (Fig. 15).

The cinematic procedure with the known knotting devices and with the knotting device shown in Figs. 13–18 is shown in Figs. 19 and 20 which show the knotting nippers diagrammatically and in front elevation, as in Figs. 17 and 18.

If the axes of rotation $O$, $O_1$ of the knotting nippers M, N are symmetrical in relation to the mid plane $x$—$x$, then the nippers M, N after a rotation of 180° also lie symmetrically in relation to the mid plane $x$—$x$ (Fig. 19). If, however, merely the knotting nippers M, N lie symmetrically in relation to the plane $x$—$x$, while the axis of rotation $O_1$ of the one nipper N is at a higher level that the axis $O$ (Fig. 20), then the nippers M, N assume positions one behind the other after rotation through 180° in the direction of the arrow II. In the direction of this arrow II there is then carried out the movement which serves for the tightening of the knot by both nippers.

It will be clear from the diagrams shown in Figs. 19 and 20 that for the obtaining of the same effect the axes of rotation $O$, $O_1$ can also be symmetrical in relation to the axis $x$—$x$, that is to say can be disposed at the same distance from the plane of the warp threads B, only in this case, which is illustrated in Fig. 21, the two knotting nippers M, N must be asymmetrical, i. e. at different distances from the plane of the warp threads B. In the position of readiness shown in Fig. 14 the knotting nippers M, N are then at different levels, and the pile thread $a$ must be inserted in the open nippers in the direction indicated by the dotted lines $a'$ (Fig. 21), that is to say inclined at an angle to the plane of the warp threads B. This is, however, easily possible, by imparting to the pile thread withdrawing nippers the direction of movement indicated by the dotted lines $a'$. After the rotation through about 180° (arrow I) the closed nippers M, N are again displaced in relation to each other in the direction of the arrow II (Fig. 21).

The mutual displacement of the knotting nippers, which constitutes the essential feature of the invention, whether it be effected permanently or merely during the tightening of the knot, can be applied to any one of the known systems of twin nipper knotting device.

I claim:—

1. A device for the mechanical manufacturing of knotted carpets and the like with Persian or Smyrna knots, comprising two rotatable and rotatably mounted knotting nippers, including jaws, the jaws of the two knotting nippers being adapted to hold fast the ends of the pieces of pile thread to be knotted during the formation of the knot and to be displaced in relation to each other in the direction of the warp threads during the carrying out of the movement required for the drawing tight of the knots.

2. A device according to claim 1, characterized by the fact that the two knotting nippers which grasp the ends of the piece of pile thread to be knotted in are positioned adjacent to each other in the direction of the weft at the commencement of the working cycle, that is to say at the moment of grasping the piece of pile thread, and are so displaced in relation to each other during the formation of the knot that they assume positions one behind the other in the direction of the warp threads during the tightening of the knot.

3. A device according to claim 1 characterized by the fact that one of the two knotting nippers is mounted in the carrier common to both knotting nippers adjustable in the direction of the warp threads, so that by means of suitable shifting means, e. g. screw threading provided thereon, a movement can be imparted to this one of the knotting nippers in the direction of the warp threads.

4. A device according to claim 1, in which the tightening of the knot loop is effected by the rocking movement of the rotatably and rockably mounted knotting nippers, characterized by the fact that the axis of rotation of one of the knotting nippers in a common carrier is so displaced in relation to the axis of rotation of the other knotting nipper that the nippers are displaced in relation to each other in the direction of the warp threads during the carrying out of their concerted movement.

5. A device according to claim 1, characterized by the fact that the jaws of the two knotting nippers which grasp the piece of pile thread to be knotted are caused to lie symmetrically, that is to say at the same distance from the plane of the warp threads, in spite of the relative displacement of their axes of rotation, by suitable cranking or curving of one of the two knotting nippers.

6. A device according to claim 1, in which the tightening of the knot loop is effected by a rocking movement of the knotting nippers, characterized by the fact that the axes of rotation of both knotting nippers are symmetrically disposed, i. e. at equal distances from the plane of the warp threads, while the clamping jaws proper of these knotting nippers are arranged asymmetrically, i. e. at different distances from the plane of the warp threads.

JOHANN GORETZKY.